(12) United States Patent
Vidoli et al.

(10) Patent No.: US 11,880,636 B2
(45) Date of Patent: Jan. 23, 2024

(54) METHOD FOR MAKING PRESTRESSED SHELLS HAVING TUNABLE BISTABILITY

(71) Applicant: UNIVERSITA' DEGLI STUDI DI ROMA "LA SAPIENZA", Rome (IT)

(72) Inventors: Stefano Vidoli, Fregene (IT); Matteo Brunetti, Rome (IT)

(73) Assignee: UNIVERSITA' DEGLI STUDI DI ROMA "LA SAPIENZA", Rome (IT)

( * ) Notice: Subject to any disclaimer, the term of this patent is extended or adjusted under 35 U.S.C. 154(b) by 498 days.

(21) Appl. No.: 17/254,003

(22) PCT Filed: Jun. 20, 2019

(86) PCT No.: PCT/IB2019/055214
§ 371 (c)(1),
(2) Date: Dec. 18, 2020

(87) PCT Pub. No.: WO2019/244096
PCT Pub. Date: Dec. 26, 2019

(65) Prior Publication Data
US 2021/0286909 A1    Sep. 16, 2021

(30) Foreign Application Priority Data
Jun. 20, 2018  (IT) .................. 102018000006527

(51) Int. Cl.
*B29C 70/54* (2006.01)
*B64F 5/10* (2017.01)
(Continued)

(52) U.S. Cl.
CPC .............. *G06F 30/10* (2020.01); *B29C 70/54* (2013.01); *B29L 2031/3085* (2013.01); *B64F 5/10* (2017.01); *G06F 2111/10* (2020.01)

(58) Field of Classification Search
CPC ...... G06F 30/10; G06F 2111/10; B29C 70/54; B64F 5/10; B29L 2031/3085
See application file for complete search history.

(56) References Cited

U.S. PATENT DOCUMENTS

| 5,226,618 A | 7/1993 | Greenhalgh |
|---|---|---|
| 6,220,550 B1 | 4/2001 | McKillip, Jr. |

(Continued)

FOREIGN PATENT DOCUMENTS

| CN | 108388696 A * | 8/2018 | ............ G01M 13/00 |
|---|---|---|---|
| EP | /ND/2 221 246 | 8/2010 | |
| EP | /ND /2 221 246 | 4/2013 | |

OTHER PUBLICATIONS

A. Pirrera et al.; "Bistable plates for morphing structures: A refined analytical approach with high-order polynomials"; International Journal of Solids and Structures 47 (2010) 3412-3425 (Year: 2010).*

(Continued)

*Primary Examiner* — Rehana Perveen
*Assistant Examiner* — Nupur Debnath
(74) *Attorney, Agent, or Firm* — NIXON & VANDERHYE

(57) ABSTRACT

In a method for manufacturing prestressed shells having tunable bistability, in order to determine the appropriate prestress to be applied to the bistable structure/shell, it provides: clamping a shell by applying a predetermined curvature on a portion of its edge; defining a discrete shell model dependent on a small number of configuration parameters $q\_i$, ($i<5$), by projecting the non-linear shell model of Marguerre-von Kármán onto an appropriate finite dimensional space so that the projection does not significantly alter the strain elastic energy; tracing the stability maps in the space of the design parameters by minimizing the discrete representation of the strain elastic energy $E(q\_i;p\_i)$ thus (Continued)

obtained; and choosing the design parameters providing the prestress needed to obtain the desired response in terms of project requirements.

19 Claims, 4 Drawing Sheets

(51) Int. Cl.
    *G06F 111/10*     (2020.01)
    *B29L 31/30*     (2006.01)
    *G06F 30/10*     (2020.01)

(56) References Cited

U.S. PATENT DOCUMENTS

2011/0084174 A1    4/2011    Hemmelgarn et al.
2012/0097791 A1    4/2012    Turner et al.
2015/0102161 A1    4/2015    Pitt et al.

OTHER PUBLICATIONS

Marta Lewicka et al.; "Models for elastic shells with incompatible strains"; https://royalsociety.org/journals/rspa.royalsocietypublishing.org Proc. R. Soc. A 470: 20130604 (Year: 2014).*
Igor Velcic; "Shallow shell models by Γ-convergence"; http://www.bcamath.org/documentos_public/archivos/publicaciones/shallowshellmms.pdf (Year: 2010).*
Henryk Stolarski et al. "Nonlinear rotation-free three-node shell finite element formulation"; International Journal for Numerical Methods in Engineering Int. J. Numer. Meth. Engng 2013; 95:740-770 (Year: 2013).*
Weidong Li et al. ; "Geometrically nonlinear analysis of thin-shell structures based on an isogeometric-meshfree coupling approach"; Comput. Methods Appl. Mech. Engrg. 336 (2018) 111-134 (Year: 2018).*
Yujie Guo et al.; "A parameter-free variational coupling approach for trimmed isogeometric thin shells"; Comput Mech (2017) 59:693-715 (Year: 2017).*
G.S. Payette et al. "A seven-parameter spectral/hp finite element formulation for isotropic, laminated composite and functionally graded shell structures"; Comput. Methods Appl. Mech. Engrg. 278 (2014) 664-704 (Year: 2014).*

F. Nicassio et al.; "Numerical and experimental study of bistable plates for morphing structures"; Active and Passive Smart Structures and Integrated Systems 2017; Proc. of SPIE vol. 10164 (Year: 2017).*
Sofla et al., "Shape morphing of aircraft wing: status and challenges," Materials and Design, vol. 31, 2010, pp. 1284-1292.
Barrarino et al., "A review of morphing aircraft," Journal of Intelligent Material Systems and Structures, vol. 22, 2011, pp. 823-877.
Gomez et al. "Morphing unmanned aerial vehicles," Smart Material and Structures, vol. 20, 103001, 2011, 16 pages.
Dano et al., "SMA-induced snap-through of unsymmetric fiber-reinforced composite laminates," International Journal of Solids and Structures, vol. 40, 2003, pp. 5949-5972.
Schultz et al., "Snap-through of unsymmetric laminates using piezocomposite actuators," Composites Science and Technology, vol. 66, 2006, pp. 2442-2448.
Arrieta et al., "Dynamic Snap-through for Morphing of Bi-stable Composite Plates," Journal of Intelligent Material Systems and Structures, vol. 22, Jan. 2011, pp. 103-112.
Senba et al., "A Two-way Morphing Actuation of Bi-stable Composites with Piezoelectric Fibers," American institute of Aeronautics and Astronautics, 51st AIAA/ASME/ASCE/AHS/ASC Structures, Structural Dynamics and Materials Conf., 2010, 10 pages.
Bilgen et al., "Dynamic control of a bistable wing under aerodynamic loading," Smart Materials and Structures, vol. 22, 025020, 2013, 15 pages.
Guest et al., "Analytical models for bistable cylindrical shells," Proceedings of the Royal Society A, vol. 462, 2006, pp. 839-854.
Seffen, "'Morphing' bistable orthotropic elliptical shallow shells," Proceedings of the Royal Society, vol. 463, 2007, pp. 67-83.
Vidoli et al., "Tristability of thin orthotropic shells with uniform initial curvature," Proceedings of the Royal Society A, vol. 464, No. 2099, Jun. 17, 2008, pp. 2949-2966.
Vidoli, "Discrete approximations of the Föppl-von Karman shell model: from coarse to more refined models," International Journal of Solids and Structures, vol. 50, 2013, pp. 1241-1252.
International Search Report and Written Opinion of the ISA for PCT/IB2019/055214 dated Oct. 10, 2019, 12 pages.
Brunetti et al., "A class of morphing shell structures satisfying clamped boundary conditions", International Journal of Solids and Structures, Elsevier, Mar. 15, 2016, vol. 82, 22 pages.

* cited by examiner (a) Equilibrium configuration $O$, stable for $F = 0$.

(b) Equilibrium configurations $C_{1,2}$, stables for $F_2 \leq F \leq F_1$.

(c) Equilibrium path.

(a) $F = 0$     (b) $F_2 \leq F \leq F_1$     (c) $F > F_1$ (a) Natural stress-free configuration of the shell, see Figure 2.

(b) Stable configuration of the clamped shell for $F = 0$, point $O$ of Figure 1.

(c) First stable configuration of the clamped shell for $F_2 \leq F \leq F_1$, point $C_1$ of Figure 1.

(d) Second stable configuration of the clamped shell for $F_2 \leq F \leq F_1$, point $C_2$ of Figure 1.

METHOD FOR MAKING PRESTRESSED SHELLS HAVING TUNABLE BISTABILITY

This application is the U.S. national phase of International Application No. PCT/IB2019/055214 filed Jun. 20, 2019 which designated the U.S. and claims priority to IT Patent Application No. 102018000006527 filed Jun. 20, 2018, the entire contents of each of which are hereby incorporated by reference.

BACKGROUND OF THE INVENTION

Field of the Invention

The present invention relates to the field of morphing structures and, more specifically, to a method for creating a shell having multiple stable equilibrium shapes or configurations at a predetermined range of applied load values. Such shell is specially suitable to produce aerodynamic surfaces: indeed, a structure with these characteristics is advantageously able to autonomously modify its shape according to the external conditions, in order to maximize aerodynamic performances or the aerodynamic resistance to advancement in all operating conditions.

Description of the Related Art

A comprehensive overview of the technological possibilities offered by the currently known morphing structures can be found in recently published papers[1,2,3], even if with relevant emphasis to aircraft moving appendices.

Several of the advanced proposals, some of which are being tested, envisage the use of multi-stable components. Indeed, these latter allow for a significant reduction in the actuation costs, since they do not require additional energy contribution besides the one needed to switch between the stable equilibrium configurations. To this end, various actuation strategies have been studied and tested, e.g. via SMA (Shape Memory ALLoys) and MFC (Macro-Fiber Composites)[4,5]; the serious difficulties encountered in both cases, in terms of integration (SMA) and of actuation power (MFC), have suggested the use of more complex techniques or expedients[6,7,8].

External actuation is necessary in all cases, while reversibility remains difficult to achieve.

With regard to the mathematical modelling of the physical phenomena involved, the relevant scientific literature is almost entirely limited to the case of free boundary conditions on all the shell edges[9,10,11,12], even if multi-stability is particularly sensitive to boundary conditions and they are common in the technological applications.

Only a recent paper published by Inventors[13] studied explicitly the case of clamped shells.

SUMMARY OF THE INVENTION

It is the primary purpose of the present invention to suggest a method for making a structure (such as a shell, a profile or a sheet) having "tunable bistability". The term "tunable bistability" means a structure which has one or more stable equilibrium configurations according to the load to which it is subjected.

A second purpose of the invention is to provide a simple additional mechanism to tune the multi-stable behavior of the structure by modifying the curvature of the clamp in operating conditions.

BRIEF DESCRIPTION OF THE DRAWINGS

These and other purposes will be better understood from the following detailed description. This description and the associated figures are intended to give a simple, non-exhaustive, example of a shell satisfying the claimed stability properties.

In particular.

DESCRIPTION OF THE PREFERRED EMBODIMENTS

An example of the suggested bistable structure is described with reference to the figures listed above.

Figure 1:
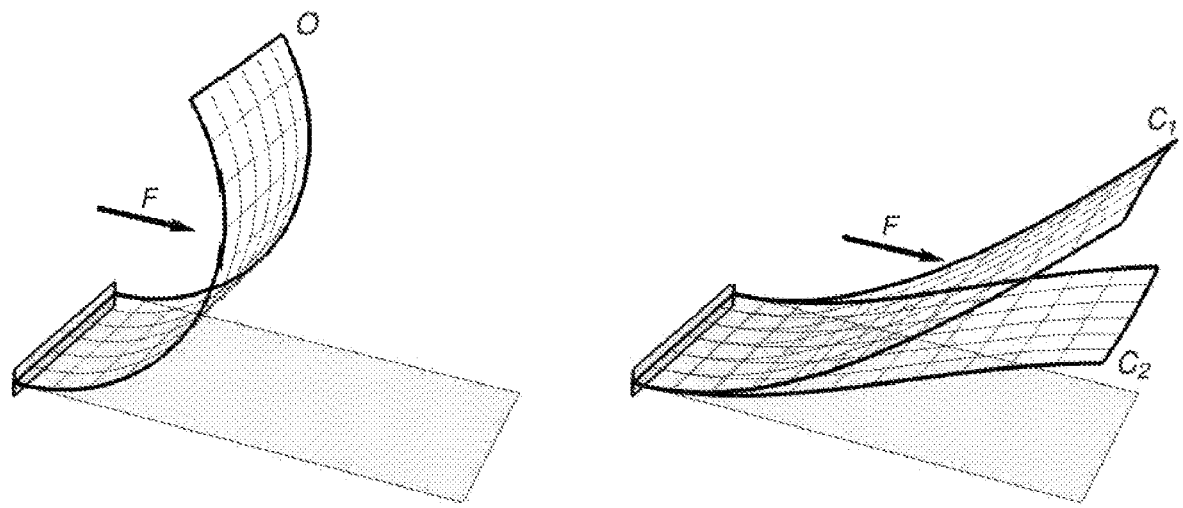
FIG. 1a illustrates the configuration of the structure without external loads.
FIG. 1b illustrates the possible configurations of the structure in the bistability region.
FIG. 1c illustrates the equilibrium paths as the load F varies.
Figure 1:
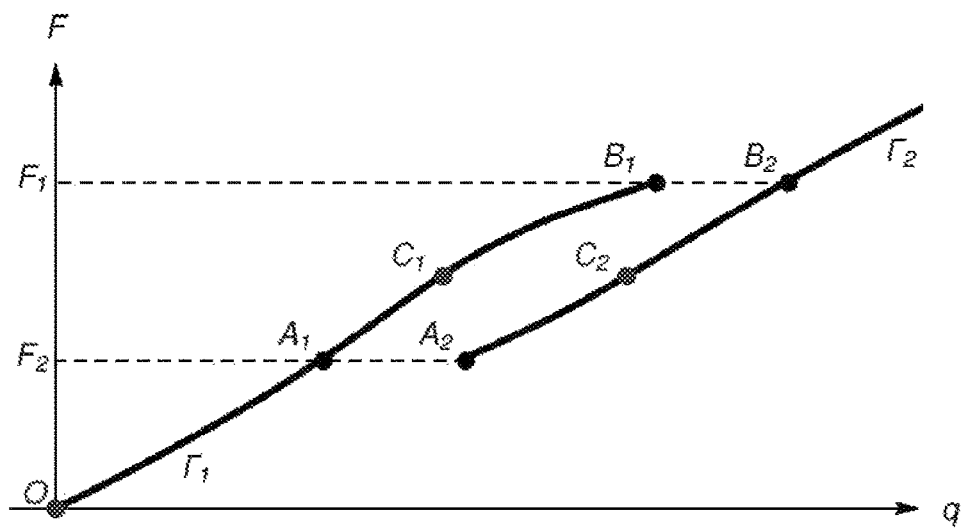
Figure 2:
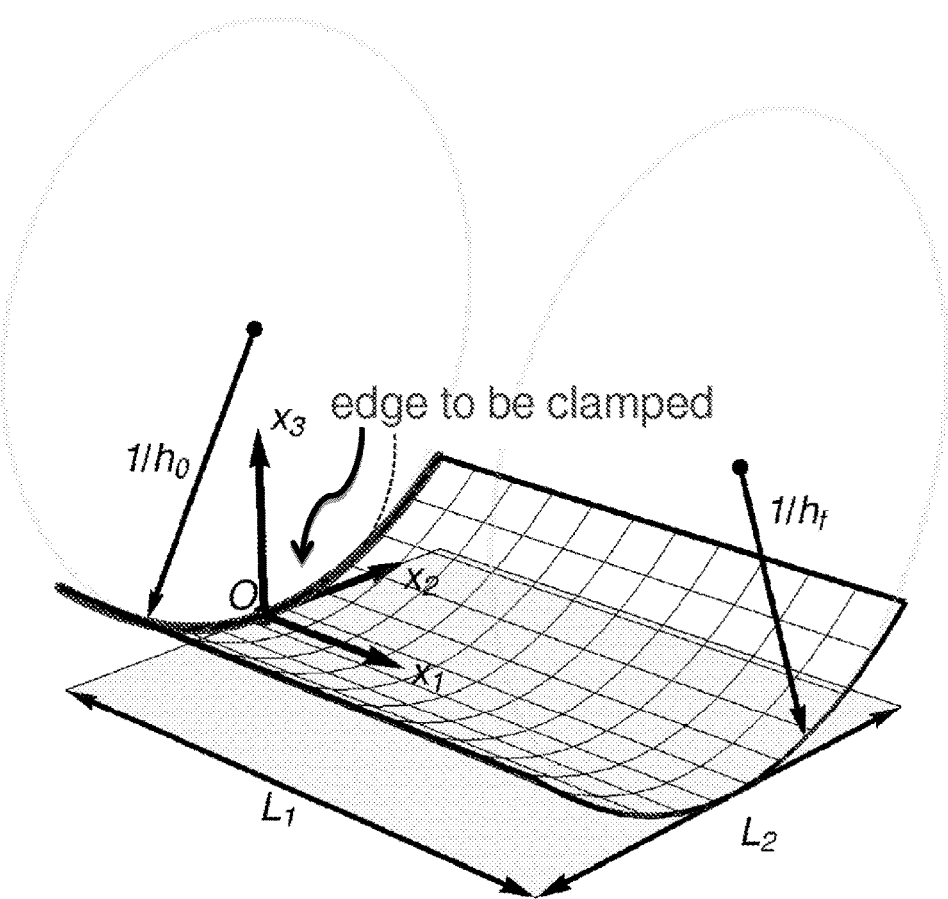
FIG. 2 illustrates the geometric parameters which describe the initial stress-free shape of the shell.

In its natural stress-free configuration the shell has the shape shown in FIG. 2. Once clamped along the edge $x_1=0$ highlighted in blue, in absence of load the shell assumes the shape shown in FIG. 1a. If the initial shape is appropriately chosen (as specified below) the shell is prestressed (meaning that each part thereof has a given level of stored elastic energy) but monostable.

Then, the behavior under load of the shell represented is shown in FIG. 1c in the plane (F,q) with F a load parameter and q a configuration parameter, as outlined below:

1. subject to a load, e.g. an aerodynamic pressure, the shell deforms following the equilibrium branch $\Gamma_1$;
2. When $F=F_1$ the branch $\Gamma_1$ becomes unstable. By increasing the load even further, the shell leaves branch $\Gamma_1$ for branch $\Gamma_2$; the transition takes place with an abrupt change of shape. The branch $\Gamma_2$ is stable for $F>F_2$. Therefore, for $F_2 \leq F \leq F_1$, the shell has two stable equilibrium configurations, FIG. 1b;
3. by increasing the load, the shell deforms following the branch $\Gamma_2$;
4. by decreasing the load, the shell returns to the branch $\Gamma_1$ when $F<F_2$ and takes the configuration O as the load is completely removed.

The non-linear equilibrium path of FIG. 1c is completely defined by the shapes that the shell assumes during the steps of loading and unloading (i.e. at low- and high-load regimes) and by the critical transition loads $F_1$ and $F_2$ which are the design requirements.

The described behavior depends on the prestress field acting in the shell in its clamped configuration O.

A peculiar feature of the present invention is precisely the choice of the prestress field that ensures the desired behaviour when varying the external applied forces.

It is suggested to induce such prestress state by clamping a shell having an appropriate (stress-free) initial shape.

Indeed, if the clamping action forces the shell to vary its Gaussian curvature, even locally, the level of prestress induced thereof is proportional to the thickness of the shell; since the bending stiffness is proportional to the cube of the thickness, for thin shells this prestress results in sizeable variations in curvature and shape.

Specifically, in order to induce the appropriate prestress field in the shell, the following method is applied:

1. A predetermined curvature is imposed on a portion of the shell edge. This part of the shell edge is then clamped. The prestress obtained by applying the clamp depends on a finite number of design parameters $p_i=\{h_{i=1, 2 \ldots}; m_{i=1, 2 \ldots}; c\}$, with $h_i$, $m_i$ being representative of the shape of the initial stress-free configuration of the shell and of the material, respectively, and c the curvature of the clamp. For example, shells whose natural stress-free configuration is of the type shown in FIG. 2 have average surface given by the function $$w_0 = \frac{x_2^2}{2}\left[h_0 + (h_f - h_0)\frac{x_1}{L_1}\right];$$

in this case the design parameters representative of the shape of the free shell are: $h_0$, the curvature of the edge $x_1=0$ which will then be clamped to induce the prestress; $h_f$, the curvature of the opposite edge, which will remain free; $L_2/L_1$, the planform aspect ratio.

For composite material shells, the representative design parameters of the material are the characteristics of the elementary ply and the lamination sequence. Again as an example, for an eight-layer anti-symmetrical laminate of the type [α/−α/−α/α/−α/α/α/−α], the design parameters are: $E_1, E_2, G_{12}, v_{12}$, the properties of the elementary ply; $t_i$, the thickness of the elementary ply; α, the lamination angle.

Thus, in this case, the prestress in the shell will depend on the choice of ten design parameters $p=\{h_0,h_1,L_2/L_1;E_1,E_2,G_{12},v_{12},t_f,\alpha;c\}$. Of these, the last, i.e. the curvature of the clamp c to be assigned to the edge $x_1=0$ can be modified in operation.

2. A discrete shell model is defined by projecting the non-linear shell model of Marguerre-von Kármán onto an appropriate finite dimensional space. The projection infers a discrete model with a few number of configuration parameters $q_i$, (i<5) and does not significantly alter the elastic energy of the shell; models of this type are described, for example, in scientific papers [12, 13]. For example, a suitable polynomial approximation of the elastic energy of the shell including membrane and bending contributions is found by choosing a polynomial form to describe the shell shape in the generic configuration and following the procedure described in detail in [13]. In this case, the configuration parameters are the coefficients $q=\{q_1, q_2, \ldots, q_n\}$ of the polynomials describing the curvature of the shell. Together with the design parameters, they define the elastic energy of the discrete shell model.

Figure 3:
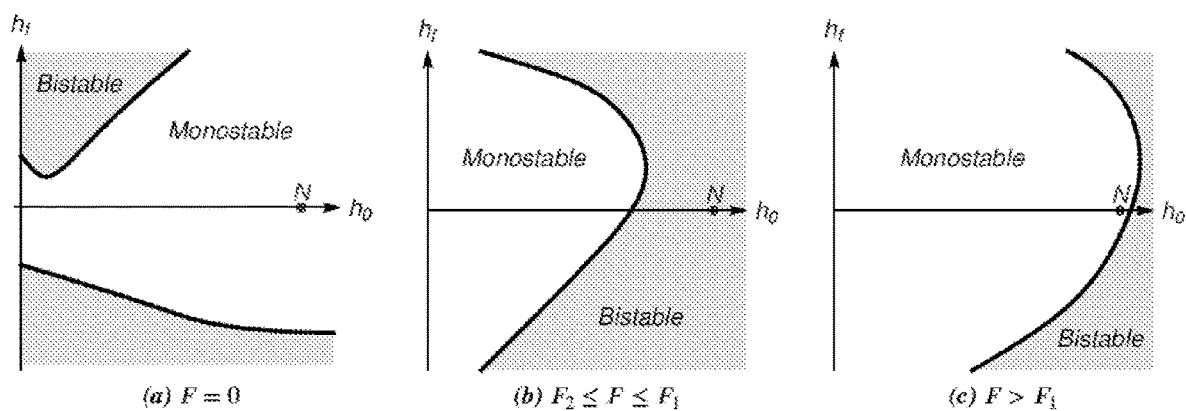
FIG. 3 illustrates the stability diagrams with respect to the geometric design parameters.

3. With the discrete representation of the elastic energy E(q;p) obtained it is possible to compute the stability maps in the space of the design parameters; for every choice of the design parameters; this allows to determine the number and the shape of the stable equilibrium configurations that the clamped shell has at each value of the applied load. For example, having fixed the material parameters (the properties of the elementary ply and the lamination sequence), the aspect ratio and the curvature of the clamp, it is possible to minimize the polynomial shape that approximates the elastic energy with respect to the configuration parameters and to determine, for each possible choice of the shell initial curvatures $h_0,h_f$ of the edges $x_1=0,L_x$ (FIG. 2), and for each value of the applied load, the number, the shape, the elastic energy, etc., of the stable equilibrium configurations that the shell exhibits after clamping, i.e. the design objectives. These informations can be summarized in plots of the type shown in FIG. 3, which relate objectives and project parameters (in this case, curvatures $h_0,h_f$) for different load values.

Figure 5:
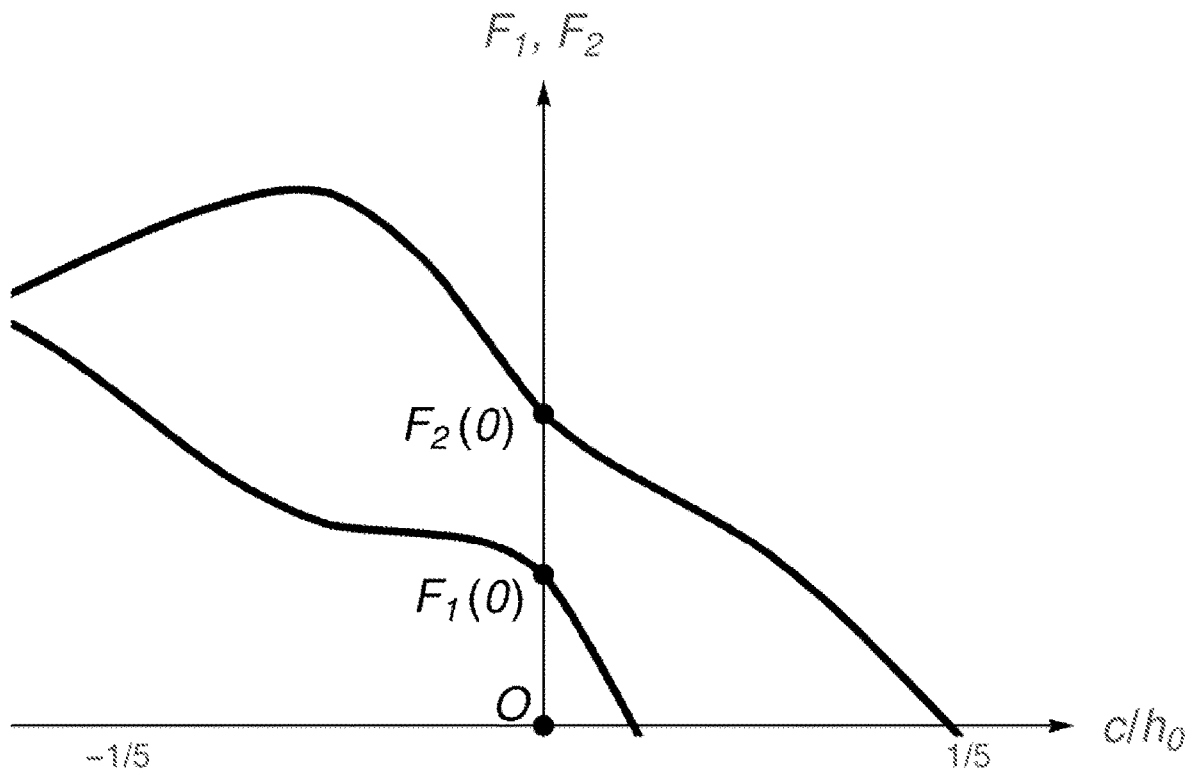
FIG. 5 illustrates the stability limits as functions of the clamp curvature.
Figure 6:
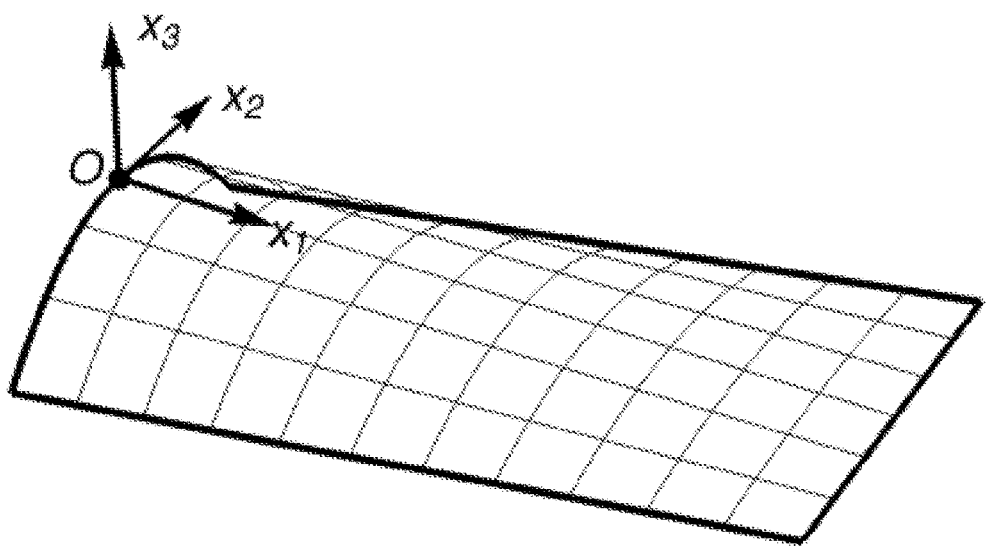
FIG. 6 illustrates the natural configuration of the free shell corresponding to point N in FIG. 3.

4. Finally, the design parameters are chosen so as to provide the prestress needed to obtain the desired response in terms of project requirements. For example, the response described in FIG. 1 is the one associated with point N of FIG. 3, i.e. the choice of the project parameters $h_0=\overline{H}$, $h_f=0$ which correspond to the initial stress-free configuration of FIG. 6. The response in FIG. 1 is obtained by considering the particular choice of the clamping curvature c=0 (that is, a flat clamp). By varying the latter, it is possible to tune either the value and ratio between the critical loads $F_1,F_2$, as well as the shape of the stable equilibrium configurations, even during operation. For example, for point N the critical loads vary with the curvature of the clamp as shown in FIG. 5.

With the method described above it is possible to:

A) design the shapes that the shell must take during the loading process according to the performance requirements;

B) set the load values at which the transition occurs, by choosing a point that has only one stable configuration for F=0, two for $F_2 \leq F \leq F_1$ and again one for $F > F_1$;

C) tune the critical transition loads also during structural operation;

D) identify the optimized shape of the shell when free from constraints.

In order to achieve the latter goal, according to a further peculiar characteristic of the invention, a clamping with tunable curvature is provided: by changing the curvature of the clamp the prestress induced in the shell is modified, and its structural response therewith, so as to meet the performance requirements of the moment. By way of non-limiting example, the curves in FIG. 5 represent the law according to which the critical transition loads $F_1$ and $F_2$ vary as the curvature assigned to the clamp varies (this latter normalised with respect to the initial curvature of the edge to be clamped). It is worth noting that also with modest variations in the curvature of the clamping it is possible to radically change the structural response, moving the critical load values closer or further apart.

In other words: once the performance requirements that the shell must guarantee have been decided (for example, the optimal geometrical configurations to be assumed in the various speed regimes and the critical velocity values), the method in the present invention makes it possible to determine the prestress field, that is, the initial geometry, the constitutive properties (e. g. the type of elementary ply and the lamination sequence) and the curvature of the clamp, to be chosen so that the performance requirements can be fulfilled; if necessary these latter can also be modified, even during the operation of the structure, simply by appropriately modifying the curvature, i. e. the shape, of the clamp.

Figure 4:
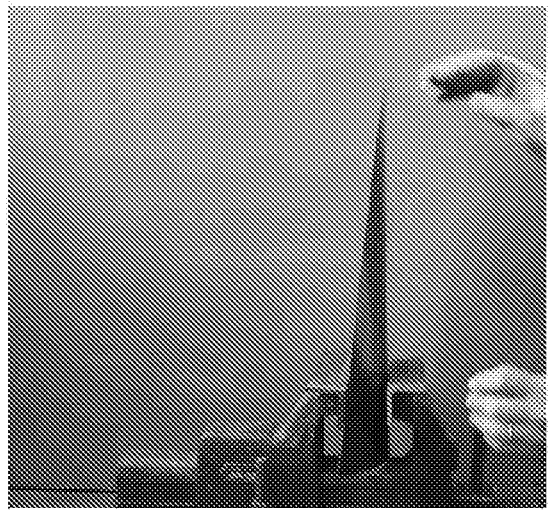
FIG. 4 illustrates a shell prototype built and tested at Dipartimento di Ingegneria StrutturaLe e Geotecnica (University of Rome "La Sapienza")
Figure 4:
Figure 4:
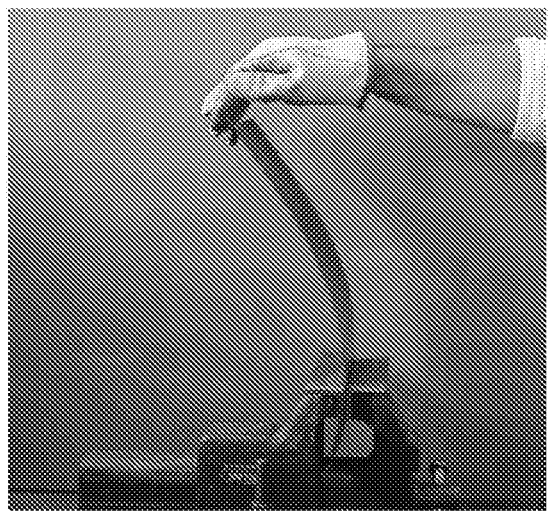
Figure 4:
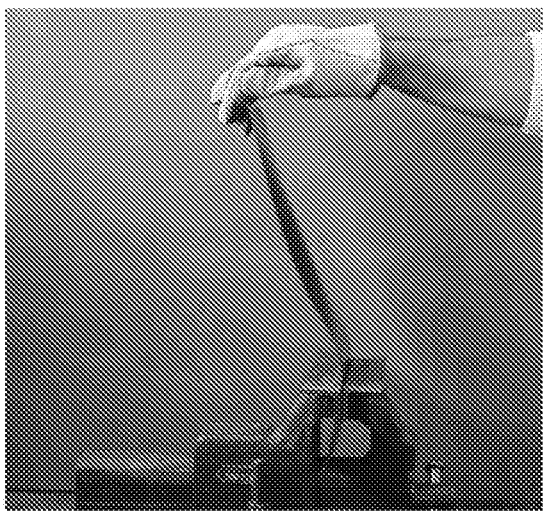

The prototype in FIG. 4 was made for experimental purposes: in FIG. 4a, the free shell, before the application of the clamp (the shape is of the type shown in FIG. 2, with $h_0 \simeq 15$ m$^{-1}$, $h_f=0$ m$^{-1}$); in FIG. 4b, the configuration assumed by the shell after the imposition of the clamp, in this case flat (c=0); in FIGS. 4c and 4d, the two stable equilibrium configurations that the shell can assume for $F_2 \le F \le F_1$.

The shell of this invention can adapt its shape autonomously to the load applied in order to meet predetermined performance requirements and maximize structural efficiency (e.g. it can be used as a component to improve the aerodynamic performance of a vehicle). The shell has a shape at low-load regimes (e.g. the most suitable for low speeds) and a different shape, even significantly different, at high-load regimes (e.g. the most suitable for high speeds), wherein the change of shape occurs spontaneously as the load varies.

By virtue of the above, the present invention provides at least the following advantages:

1. no actuating energy other than that supplied by the load directly acting on the shell is required; therefore, it is not necessary to provide actuators;
2. unlike traditional bistable structures, the shell returns to its original shape when the load is removed with no need for external intervention: in all cases, the equilibrium path is closed, i.e. the reversibility of the transformation is ensured;
3. the design concerns both the shapes required during loading and unloading and the critical transition load values, i.e. all the parameters that define the equilibrium path;
4. the possibility of varying the curvature of the clamp makes it possible to modify stable shapes and transition loads, even while the structure is in operation.

Because of its ability to be efficient under radically different operating conditions, the present invention has many possibilities for use in various areas of industrial engineering, e.g. in the manufacture of morphing aerodynamic appendages, and in civil engineering, e.g. in the manufacture of building envelopes and adaptive ventilation systems. In the field of industrial engineering, in particular, the invention is a reliable and cost-effective solution. Indeed, it is not necessary to supply power to the system nor is it necessary to use gear systems or other means, because:

A. the transition between the different structural forms is induced by external load itself;
B. the maintenance of each of them is ensured by its stability.

In conclusion, it is useful to point out that, according to the present invention, the shell is not initially prestressed: only with the application of the constraint the appropriate prestress field is induced within it.

Inter alia, this prestress is a function of the natural stress-free shape of the shell, i.e. the shape of the shell when it is free of external constraints, i.e. before it is clamped at one end.

Furthermore, according to the invention, the shape of the shell in the stress-free configuration is a fundamental parameter to be optimized (along with the constitutive properties of the material), which is not given a priori but has to be chosen on the basis of the design requirements: the critical transition loads and the optimal shell shapes for low- and high-load regimes.

LITERATURE

1. A. Y. N. Sofla et al. Shape morphing of aircraft wing: status and challenges. *Mater Design.* 31 1284-92, 2010.
2. S. Barbarino et al. A review of morphing aircraft. *J InteLL Mater Struct* 22 823-77, 2011.
3. J. C. Gomez and E. Garcia. Morphing unmanned aerial vehicles. *Smart Mater Struct.* 20 103001, 2011.
4. M. L. Dano and M. W. Hyer. Sma-induced snap-through of unsymmetric fiber reinforced composite laminates. *Int. J. SoLids Struct.* 40 5949-72, 2003.
5. M. R. Schultz et al. Snap-through of unsymmetric laminates using piezocomposite actuators. *Compos. Sci. Technol.* 66 2442-8, 2006.
6. Arrieta et al. Dynamic snap-through for morphing of bistable composite plates. *J. Intell. Mater. Syst. Struct.* 22 103-22, 2011.
7. Senba et al. A two-way morphing actuation of bistable composites with piezoelectric fibers 51*st AIAA/ASME/ASCE/AHS/ASC Structures, StructuraL Dynamics and MateriaLs Conf.*, 2010
8. O. Bilgen et al. Dynamic control of a bistable wing under aerodynamic loading. *Smart Mater. Struct.* 22 025020, 2013.
9. S. Guest and S. Pellegrino. Analytical models for bistable cylindrical shells. *Proc. R. Soc. A*, 462, 839-854, 2006.
10. K. A. Seffen. 'Morphing' bistable orthotropic elliptical shallow shells. *Proc. R. Soc. A* 463, 67-83, 2007.
11. S. Vidoli and C. Maurini. Tristability of thin orthotropic shells with uniform initial curvature. *Philos. T. R. Soc. A*, 464(2099):2949-2966, 2008.
12. S. Vidoli. Discrete approximations of the Föppl-von Kármán shell model: from coarse to more refined models. *Int. J. Solids Struct.*, 50:1241-1252, 2013.
13. M. Brunetti et al. A class of morphing shell structures satisfying clamped boundary conditions. *Int. J. Solids Struct.*, 82:47-55, 2016.

The invention claimed is:

1. A design method for manufacturing prestressed shells having tuned bistability, wherein, to determine the appropriate prestress to be applied to the bistable structure/shell, the method comprises the following operating steps:

A). using a clamp, clamping material of a shell by applying a predetermined curvature on a portion of the shell's edge: the prestress which is obtained by imposing the clamp depends on a finite number of design parameters $p_i = \{h_{i=1, 2 \ldots}; m_{i=1, 2 \ldots}; c\}$: $h_i$, $m_i$ are the parameters representative of a shape of the initial stress-free configuration of the shell free from external constraints, and of the material while c is the curvature of the clamp;

B). defining a discrete shell model dependent on a small number of configuration parameters $q_i$, (i<5) by projecting the non-linear shell model of Marguerre-von Kármán onto an appropriate finite dimensional space;

C). tracing stability maps in the space of the design parameters by means of the discrete representation of the elastic energy $E(q_i; p_i)$ thus obtained to determine the number and the shape of the stable equilibrium configurations of the clamped shell, which at each load level correspond to a particular choice of the design parameters;

D). choosing the design parameters providing the necessary prestress to obtain a desired behaviour in terms of project requirements;

whereby obtaining:
  designing the shapes that the shell must assume during the loading process according to performance requirements;
  establishing critical load levels at which the transition must occur, choosing a point whose corresponding clamped shell has only one stable configuration for F=0, two for $F_2 \leq F \leq F_1$ and again one for $F>F_1$;

changing critical transition loads also during the operation of the structure, to fulfill changes in the performance requirements; and identifying a corresponding optimized shape of the shell when free from constraints.

2. A method according to claim 1, wherein, as regards step A), shells whose natural stress-free configuration has average surface given by the function:

$$w_0 = \frac{x_2^2}{2}\left[h_0 + (h_f - h_0)\frac{x_1}{L_1}\right]$$

wherein the design parameters representative of the shape of the shell are in this case:

$h_0$, which is the curvature of the edge $x_1=0$ which will be clamped to induce the prestress;

$h_f$, which is the curvature of the opposite edge, which remains free;

$L_2/L_1$, the planform aspect ratio.

3. A method according to claim 1, wherein, as regards step A), for composite shells the design parameters representative of the material are the characteristics of the elementary ply and the lamination sequence.

4. A method according to claim 3, wherein by choosing an eight-layer antisymmetric laminate of the [α/−α/−α/α/α/−α/α/α/−α] type, the design parameters are: $E_1,E_2,G_{12},v_{12}$, which are the properties of the elementary ply; $t_l$, which is the thickness of the elementary ply; α, which is the lamination angle; thus obtaining that the prestress in the shell is a function of the choice of ten design parameters p={$h_0,h_1$, $L_2/L_1;E_1,E_2,G_{12},v_{12},t_l,\alpha;c$} the last of which, where the curvature of the clamp c to be assigned to the side $x_1=0$, is modifiable during operation.

5. A method according to claim 1, wherein, as regards step B), to obtain a discrete approximation of the elastic energy of the shell, comprising the membrane and bending contributions, a polynomial form is chosen to describe the curvature of the shell in the generic configuration; in this case the configuration parameters being the coefficients q={$q_1$, $q_2$, ..., $q_n$} of the polynomials describing the curvature of the shell and that, together with the design parameters, define the elastic energy thereof.

6. A method according to claim 1, wherein, as regards step C), setting the material parameters relating to:

characteristics of the elementary ply,
lamination sequence,
aspect ratio,
curvature of the clamping,
minimizing the polynomial approximation of the elastic energy with respect to the configuration parameters and to determine, for each possible choice of curvatures $h_0,h_f$ of the edges $x_1=0,L_x$ of the free shell and for each load level, the number, the shape, the elastic energy of the stable equilibrium configurations that the shell exhibits after clamping its $x_1=0$ edge.

7. A method according to claim 6, wherein, the information concerning the stable equilibrium configurations that the shell exhibits after clamping part of its boundary is represented in graphs relating design objectives and the parameters.

8. A method according to claim 1, further comprising varying the curvature of the clamp to modify—during the operation of the structure—the value and the ratio between the critical loads $F_1,F_2$, as well as the shape of the stable equilibrium configurations.

9. A method according to claim 1, wherein, in order to vary the critical transition loads, including during the operation of the structure, providing the clamp with a variable curvature so that by changing the curvature of the clamp the prestress induced in the shell is modified and with it, its structural response.

10. A method according to claim 1, wherein, having established the response that the shell must provide in the various operating conditions, the method comprises determining:

the prestress field and the initial geometry therewith,
the constitutive properties, and
the curvature of the clamp to be assigned so that the desired behaviour is guaranteed.

11. A method according to claim 10, wherein the curvature of the clamp is modified for the supervening of different performance requisites, even during the operation of the structure, by appropriately modifying the shape of the clamp.

12. A method according to claim 2, wherein, as regards step A), for composite shells the design parameters representative of the material are the characteristics of the elementary ply and the lamination sequence.

13. A method according to claim 2, wherein, as regards step B), to obtain a discrete approximation of the elastic energy of the shell, comprising the membrane and bending contributions, a polynomial form is chosen to describe the curvature of the shell in the generic configuration; in this case the configuration parameters being the coefficients q={$q_1$, $q_2$, ..., $q_n$} of the polynomials describing the curvature of the shell and that, together with the design parameters, define the elastic energy thereof.

14. A method according to claim 3, wherein, as regards step B), to obtain a discrete approximation of the elastic energy of the shell, comprising the membrane and bending contributions, a polynomial form is chosen to describe the curvature of the shell in the generic configuration; in this case the configuration parameters being the coefficients q={$q_1$, $q_2$, ..., $q_n$} of the polynomials describing the curvature of the shell and that, together with the design parameters, define the elastic energy thereof.

15. A method according to claim 4, wherein, as regards step B), to obtain a discrete approximation of the elastic energy of the shell, comprising the membrane and bending contributions, a polynomial form is chosen to describe the curvature of the shell in the generic configuration; in this case the configuration parameters being the coefficients q={$q_1$, $q_2$, ..., $q_n$} of the polynomials describing the curvature of the shell and that, together with the design parameters, define the elastic energy thereof.

16. A method according to claim 2, wherein, as regards step C), setting the material parameters relating to:

characteristics of the elementary ply,
lamination sequence,
aspect ratio,
curvature of the clamping,
minimizing the polynomial approximation of the elastic energy with respect to the configuration parameters and to determine, for each possible choice of curvatures $h_0,h_f$ of the edges $x_1=0,L_x$ of the free shell and for each load level, the number, the shape, the elastic energy of the stable equilibrium configurations that the shell exhibits after clamping its $x_1=0$ edge.

17. A method according to claim 3, wherein, as regards step C), setting the material parameters relating to:
- characteristics of the elementary ply,
- lamination sequence,
- aspect ratio,
- curvature of the clamping,
- minimizing the polynomial approximation of the elastic energy with respect to the configuration parameters and to determine, for each possible choice of curvatures $h_0, h_f$ of the edges $x_1=0, L_x$ of the free shell and for each load level, the number, the shape, the elastic energy of the stable equilibrium configurations that the shell exhibits after clamping its $x_1=0$ edge.

18. A method according to claim 4, wherein, as regards step C), setting the material parameters relating to:
- characteristics of the elementary ply,
- lamination sequence,
- aspect ratio,
- curvature of the clamping,
- minimizing the polynomial approximation of the elastic energy with respect to the configuration parameters and to determine, for each possible choice of curvatures $h_0, h_f$ of the edges $x_1=0, L_x$ of the free shell and for each load level, the number, the shape, the elastic energy of the stable equilibrium configurations that the shell exhibits after clamping its $x_1=0$ edge.

19. A method according to claim 5, wherein, as regards step C), setting the material parameters relating to:
- characteristics of the elementary ply,
- lamination sequence,
- aspect ratio,
- curvature of the clamping,
- minimizing the polynomial approximation of the elastic energy with respect to the configuration parameters and to determine, for each possible choice of curvatures $h_0, h_f$ of the edges $x_1=0, L_x$ of the free shell and for each load level, the number, the shape, the elastic energy of the stable equilibrium configurations that the shell exhibits after clamping its $x_1=0$ edge.

* * * * *